United States Patent [19]

Klein et al.

[11] 4,233,640
[45] Nov. 11, 1980

[54] GROUND FAULT APPARATUS AND PROTECTION SYSTEM

[75] Inventors: Keith W. Klein, Simsbury; Joseph M. Palmieri; Gregory C. Eckart, both of Southington, all of Conn.

[73] Assignee: General Electric Company, New York, N.Y.

[21] Appl. No.: 24,229

[22] Filed: Mar. 26, 1979

[51] Int. Cl.³ ............................................. H02H 3/347
[52] U.S. Cl. ........................................ 361/44; 361/46
[58] Field of Search ................................. 361/44–50, 361/42, 115, 332; 335/18

[56] References Cited

U.S. PATENT DOCUMENTS

| | | | |
|---|---|---|---|
| 3,869,649 | 3/1975 | Hobson, Jr. | 361/46 |
| 3,953,766 | 4/1976 | Howell | 361/45 |
| 4,010,432 | 3/1977 | Klein et al. | 361/43 X |
| 4,044,395 | 8/1977 | Eckart | 361/44 |
| 4,156,884 | 5/1979 | Eckart et al. | 361/46 |

Primary Examiner—Patrick R. Salce
Attorney, Agent, or Firm—Robert A. Cahill; Walter C. Bernkopf; Philip L. Schlamp

[57] ABSTRACT

A unique ground fault circuit interrupting (GFCI) device is utilized to control either an industrial circuit breaker or a contactor in protecting a large power distribution circuit against ground faults. The GFCI device is equipped with plural sets of switch contacts which are actuated incident with tripping of the GFCI device. The particular switch contacts are selected to control energization of an actuator adapted to the circuit breaker or contactor, depending on the actuator type. A ground fault sensor responds to ground faults on the distribution circuit by injecting a current imbalancing signal into the GFCI device, causing it to trip. The consequent switch contact actuation initiates operation of the circuit breaker or contactor to interrupt the distribution circuit.

11 Claims, 9 Drawing Figures

GROUND FAULT APPARATUS AND PROTECTION SYSTEM

BACKGROUND OF THE INVENTION

Ground fault protection for personnel and electrical equipment is an ever increasing concern in both home and industry. For residential circuit applications, ground fault circuit interrupting (GFCI) devices are now widely available in compact circuit breaker and receptacle configurations for convenient installation in existing service entry equipment and wall receptacle boxes. These GFCI devices are primarily intended to protect people from the hazards of electrical shock caused by leakage current emanating from ground faults, however they do afford a measure of equipment protection in terms of acting to halt ground fault current which can cause fires.

For high current applications found in industry, ground fault protection is available in basically two configurations. With the event of so-called "static trip" circuit breakers, it has become economically possible to combine overcurrent and ground fault signal processing circuitry in a compact electronic trip unit package which can be integrated with the circuit breaker to achieve comprehensive circuit protection. Alternatively, traditional circuit breakers having thermal-magnetic and dual-magnetic trip units for overcurrent protection can be utilized with so-called "ground fault relays" in providing ground fault protection as well. These relays respond to a ground fault signal developed by a suitable sensor, such as a zero sequence transformer coupled with the load carrying conductors, by energizing a solenoid which then trips the breaker to initiate circuit interruption.

U.S. Pat. No. 4,044,395, issued Aug. 23, 1977 and assigned to the assignee of the instant application, discloses a system for protecting relatively large power distribution circuits against ground faults by utilizing as its principle operating component a conventional GFCI device normally used in low power, residential circuit applications. As disclosed and claimed therein, the GFCI device is installed in a control circuit for an undervoltage release solenoid adapted to a conventional circuit breaker protecting the distribution circuit or in the control circuit for the holding coil of a contactor operating in the distribution circuit. A ground fault sensor in the form of a zero sequence transformer coupled with the load current carrying conductors of the distribution circuit develops a voltage in its secondary winding in response to a ground fault on the distribution circuit. This voltage is then utilized to create a current imbalance of the nature to which the GFCI device is responsive. The GFCI device trips to interrupt the control circuit, and the undervoltage release solenoid drops out to trip the circuit breaker or the holding coil becomes de-energized to open the contactor. In either case, the distribution circuit is interrupted to clear the ground fault.

It is an object of the present invention to provide inexpensive ground fault protection apparatus and system utilizing same, which are suitable for application to high voltage, industrial circuit applications.

An additional object of the present invention is to provide a ground fault protection apparatus of the above character which is adaptable to various system configurations accommodating different types of industrial circuit current interrupters and actuators therefor.

A further object of the present invention is to provide a ground fault protection system of the above character, wherein the operative ground fault apparatus is equipped with both normally open and normally closed switch contacts individually capable of functioning to control the operation of current interrupting devices in interrupting an industrial circuit pursuant to clearing a ground fault thereon.

Other objects of the invention will in part be obvious and in part appear hereinafter.

SUMMARY OF THE INVENTION

In accordance with the present invention, there is provided a ground fault protection system ideally suited for application to high current, high voltage power distribution circuits, wherein the system utilizes as its principle operating component the basic structural features of a ground fault circuit interrupting (GFCI) device widely used in low voltage residential-type circuits. As is well known, such GFCI devices utilize a differential current transformer to sense imbalances in the currents flowing through separate primary windings thereof enroute to and returning from a load, as would be occasioned by leakage current returning to the source through an unintended ground path. The differential current transformer develops a secondary winding analog signal proportional to this leakage current which is processed by electronic circuitry, and, if of a predetermined magnitude and duration, an electronic switch is triggered to complete an energization circuit for a solenoid. Upon energization, the solenoid plunger strikes a latch to release a spring powered mechanism which is freed to open normally closed GFCI device contacts, clearing the ground fault through which the leakage current originates.

In accordance with the present invention, the GFCI device utilizes the basic structural features of a known ground fault receptacle and is further equipped with an additional, normally open switch. This additional switch is operatively coupled to the GFCI device contacts such as to be closed when the device contacts open.

To sense the existence of a ground fault on the distribution circuit, a ground fault sensor is coupled with the load current carrying conductors of the distribution circuit for developing a voltage signal indicative of the ground fault current magnitude. This voltage signal is applied to produce a current flowing through one of the differential current transformer primary windings, thereby creating a net primary current excitation sensible by electronic circuitry of the ground fault module. The GFCI device trips, opening its contacts and closing the additional switch. If the industrial circuit interrupting device is a circuit breaker equipped with an undervoltage release (UVR) solenoid or a contactor, the UVR solenoid or the contactor holding coil energization circuit is wired through the normally closed device contacts, such that, when the GFCI device trips, the energization circuit is interrupted to, in turn, initiate interruption of the industrial circuit. If the industrial circuit interrupting device is a circuit breaker equipped with a shunt trip solenoid, the energization circuit therefor is wired through the normally open additional switch, such that, when the GFCI device trips, the additional switch closes to complete this energization circuit and, in turn, initiate interruption of the industrial circuit.

As an incidental, but nevertheless significant feature of the present invention, the control power source energizing the GFCI device may also be utilized to feed control loads. Such loads may include alarms, signal lights, etc. traditionally found in motor control centers, for example. By appropriate system interconnection of these loads, the GFCI device, and the control power source, personnel ground fault protection is provided in addition to equipment ground fault protection for the distribution circuit.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which.

Corresponding reference numerals refer to like parts throughout the several views of the drawings.

DETAILED DESCRIPTION

Figure 1:
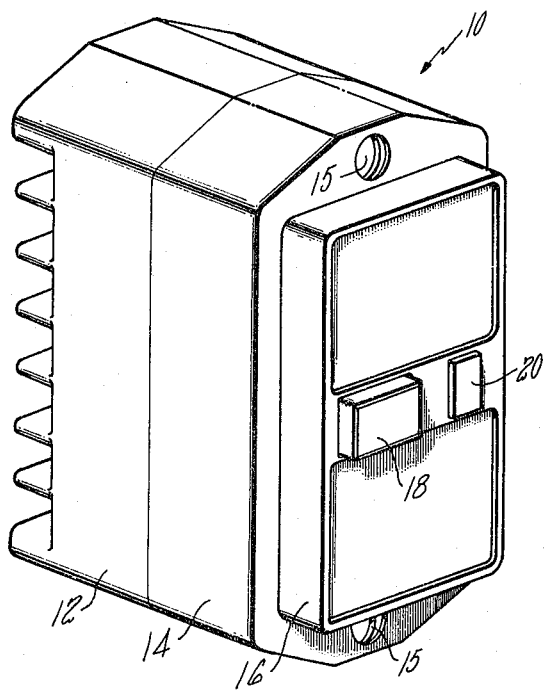
FIG. 1 is a front perspective view of a ground fault circuit interrupting (GFCI) device utilized in the distribution circuit ground fault protection system of the present invention.
Figure 2:
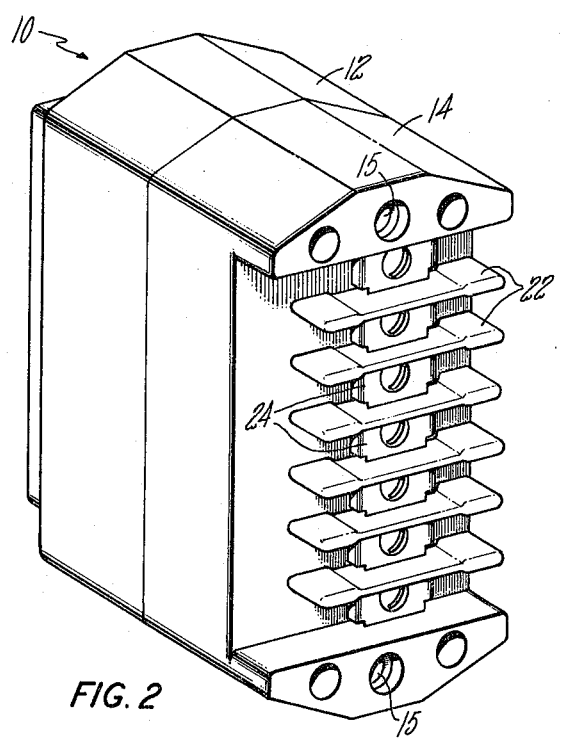
FIG. 2 is a rear perspective view of the GFCI device of FIG. 1.

Referring to FIG. 1, a ground fault circuit interrupting device, generally indicated at 10, is constructed in accordance with the present invention to include a mold case consisting of a base 12 and a cover 14 held together by suitable fasteners, such as rivets 15. The front surface of the cover is provided with a raised escutcheon 16 having openings therein through which a reset button 18 and a test button 20 protrude. Molded into the bottom surface of base 14 are series of insulative dividers 22, as seen in FIG. 2, individually separating plural screw terminals 24 in terminal block fashion. From FIG. 3, it is seen that these screw terminals are each equipped with a pair of tangs 24a which penetrate the floor 12a of base 12 to facilitate solder connections with the internal wiring of the GFCI device 10, whose schematic will be described in connection with FIG. 6.

Dividers 22a are molded into the interior side of floor 14a to afford isolation between adjacent screw terminal tangs 24a.

In accordance with a signal feature of the present invention, the internal components of GFCI device 10 are largely constructed in the manner disclosed in commonly assigned U.S. Pat. No. 4,010,432, entitled Electrical Receptacle Equipped with Ground Fault Protection. This patent is directed to a ground fault electrical receptacle which can be substituted for a conventional electrical receptacle in existing outlet boxes. In addition to a pair of sockets into which conventional appliance cord plugs can be inserted, this ground fault receptacle includes a ground fault module consisting of a differential current transformer and an electronic signal processor. The differential current transformer senses any imbalance in the currents flowing out to and returning from the loads plugged into the receptacle which, as is well understood in the art, signifies a ground fault condition. The resulting signal voltage induced in the differential transformer secondary winding is processed by the electronics pursuant to triggering a thyristor into conduction. The conducting thyristor draws activating current through a solenoid whose plunger is then actuated to defeat a latch normally holding circuit interrupting contacts in their closed condition against the bias of contact opening springs. The contacts thus spring open to remove power from the receptacle sockets and thus interrupt the flow of ground leakage current.

Figure 4:
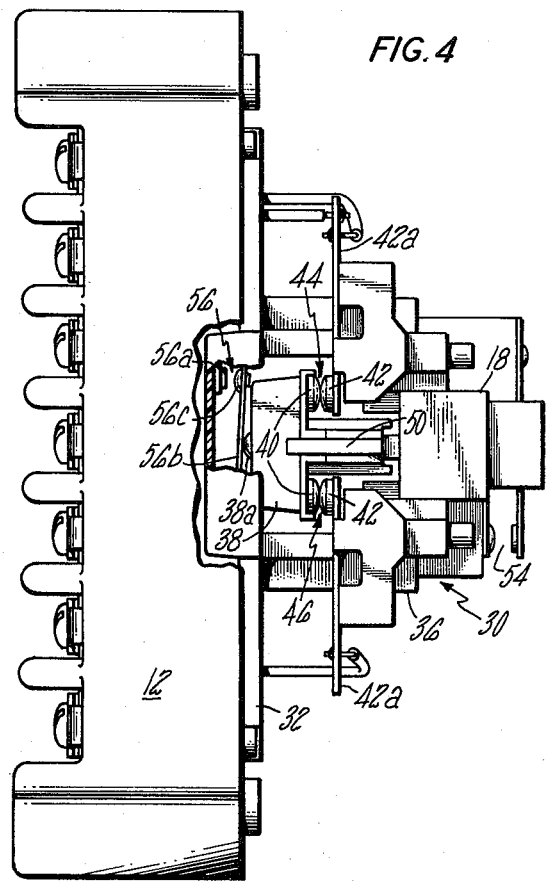
FIG. 4 is a side elevational view, partially broken away, of the GFCI device of FIG. 1 with its cover removed and seen in an untripped condition.

As is apparent from FIG. 1 GFCI device 10 is not equipped with the duplex plug sockets of the ground fault receptacle in U.S. Pat. No. 4,010,432. The GFCI device of the present invention does, however, advantageously utilize the same circuit interrupting contact or switch operating mechanism and ground fault module of this patent. The internal wiring is altered to accomodate application to power distribution circuit ground fault protection systems, and a normally open switch is added in a unique manner to accommodate shunt tripping of a power circuit breaker installed in the distribution circuit. Thus, as seen in FIG. 4 herein, a switch operating mechanism, generally indicated at 30, is affixed to the right side of a generally rectangular support plate 32 positionally mounted in base 12 proximate its junction with cover 14. Affixed to the left side of this support plate is a ground fault module (not shown in FIG. 4, but indicated diagrammatically at 34 in FIG. 6) in the manner disclosed in U.S. Pat. No. 4,010,432. The operating mechanism includes a mounting block 36 which serves to pivotally mount an elongated arm 38 which is spring biased to the left, again in the manner disclosed in this patent. Arm 38 mounts a pair of movable contacts 40 which respectively engage an associated pair of stationary contacts 42 to create a pair of normally closed switches, generally indicated at 44 and 46. In contrast to the ground fault receptacle construction of the above-noted patent, the stationary contacts are mounted by mounting block 36, rather than by plug socket connector straps. Thus, as seen in FIG. 4 herein, stationary contacts 42 are affixed to separate conductive strips 42a secured to mounting block 36. Also in departure from the receptacle construction, movable contacts 40 are electrically connected in common by a jumper, diagrammatically indicated at 40a in FIG. 6, rather than being separately electrically connected to the line and neutral sides of the source feeding the receptacle.

As in U.S. Pat. No. 4,010,432, spring biased reset button 18 herein is reciprocally mounted by mounting block 36 for manual depression to control a latch 50 in picking up movable contact arm 38; the reset button spring force acting to overpower the movable arm spring force upon release of the reset button pursuant to propelling movable contacts 40 into engagement with stationary contacts 42. Mounting block 36 also supports a solenoid, seen diagrammatically at 52 in FIG. 6, which, in the event of a ground fault, is energized under the control of ground fault module 34. The solenoid plunger is thus actuated to strike latch 50, thereby unlatching arm 38 which springs to its open circuit position of FIG. 5 with the stationary and movable contacts in disengaged relation. Also, reset button 18 springs to an extended, trip indicating position of pronounced protrusion through its opening in cover 14, all as disclosed in U.S. Pat. No. 4,010,432. Contact re-engagement is achieved simply by digital depression and release of the reset button to re-engage latch 50 with movable contact arm 38.

Mounting block 36 also supports the contacts of a normally open test switch 54 which is closed by depression of test button 20 (FIG. 1) to create a simulated ground fault condition in a manner well known in the art. If the GFCI device 10 is operational, closure of test switch 54 will initiate unlatching of movable contact arm 38 and consequent disengagement of the stationary and movable contacts.

Figure 5:
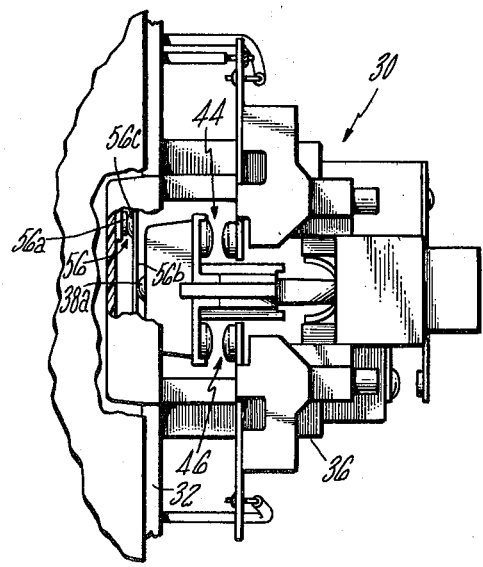
FIG. 5 is a fragmentary side elevational view, partially broken away, of the GFCI device of FIG. 1, seen in its tripped condition.

As an additional departure from the ground fault receptacle construction of U.S. Pat. No. 4,010,432, power for ground fault module 34 herein is brought in through one of the normally closed switches 44, 46, thus advantageously freeing the module power switch of this patent for utilization in the ground fault protection system of the present invention. The receptacle module power switch consisted of a normally closed switch which is actuated to its open circuit condition by the movable contact arm as it springs to its open circuit position. In accordance with the present invention, this switch is converted from a normally closed configuration to a normally open configuration. Thus, as seen in FIGS. 4 and 5, support plate 32 mounts a stationary contact 56a and a spring arm 56b carrying at its free end a movable contact 56c constituting a switch, generally indicated at 56. Arm 56b is sprung such that the switch contacts are normally disengaged as seen in FIG. 4. When movable contact arm 38 springs to its open circuit position of FIG. 5, a projection 38a thereof engages spring arm 56b, forcing closure of switch 56.

Figure 3:
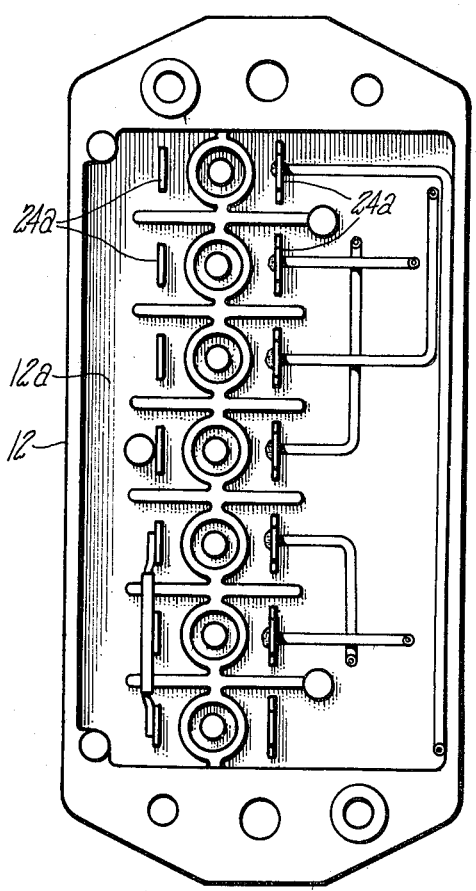
FIG. 3 is a plan view of the empty base portion of the GFCI device case seen in FIG. 1.
Figure 6:
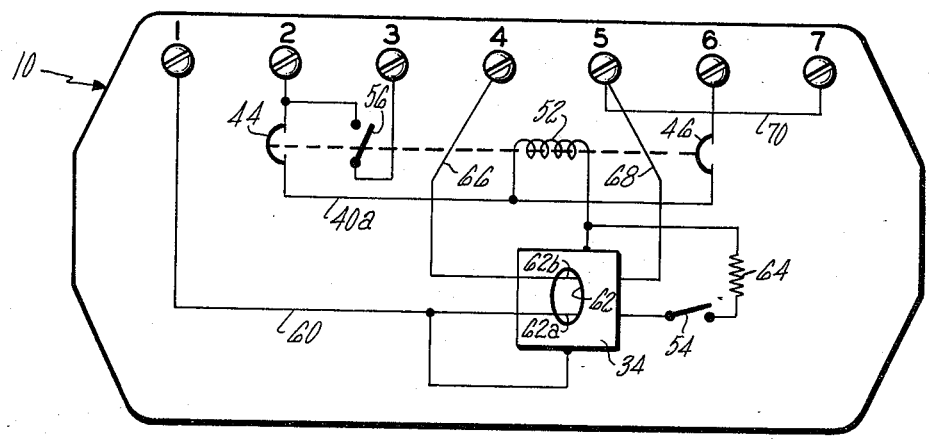
FIG. 6 is a circuit schematic diagram, partially in block form, for the GFCI device of FIG. 1.
Figure 7:
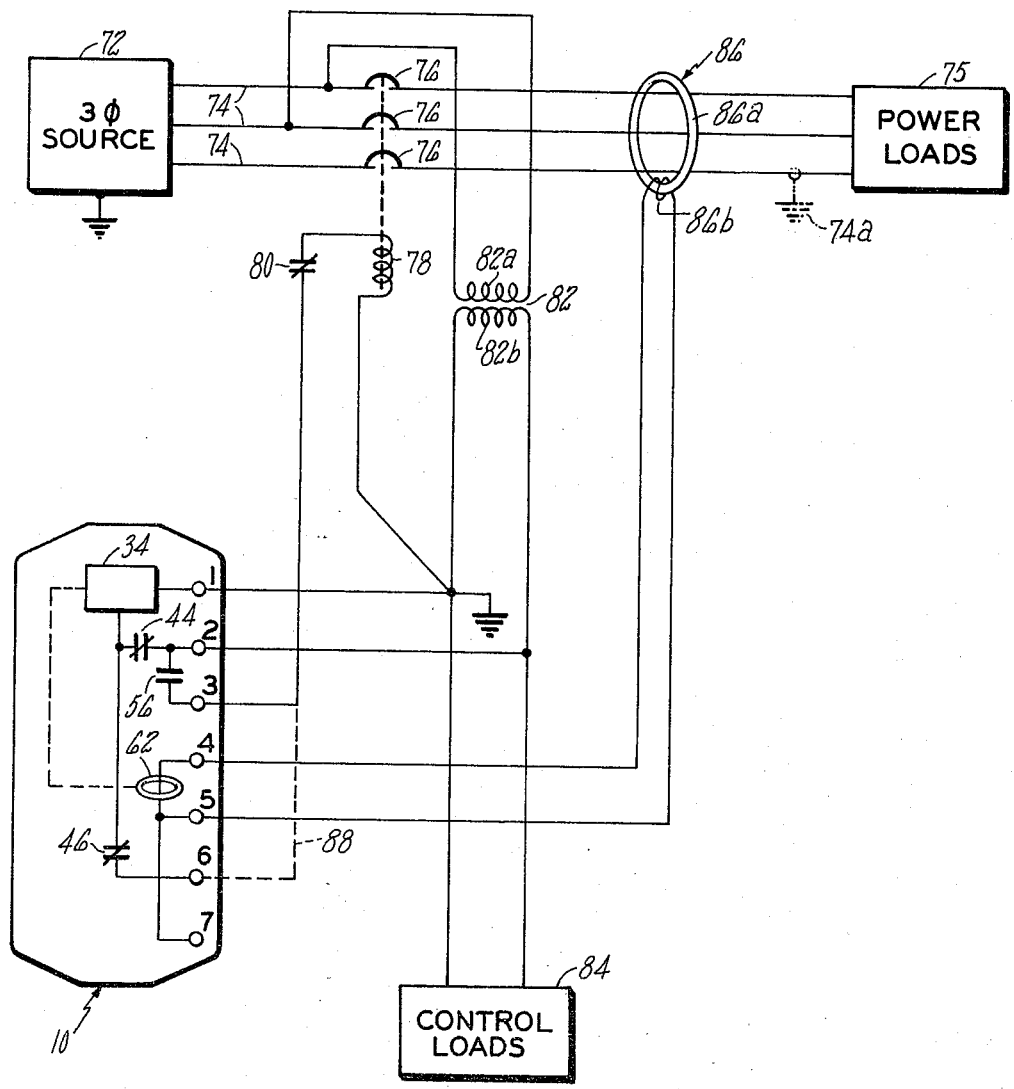
FIG. 7 is a circuit schematic diagram, partially in block form, depicting the GFCI device of FIG. 1 as utilized in a distribution circuit ground fault protection system according to one embodiment of the present invention.
Figure 8:
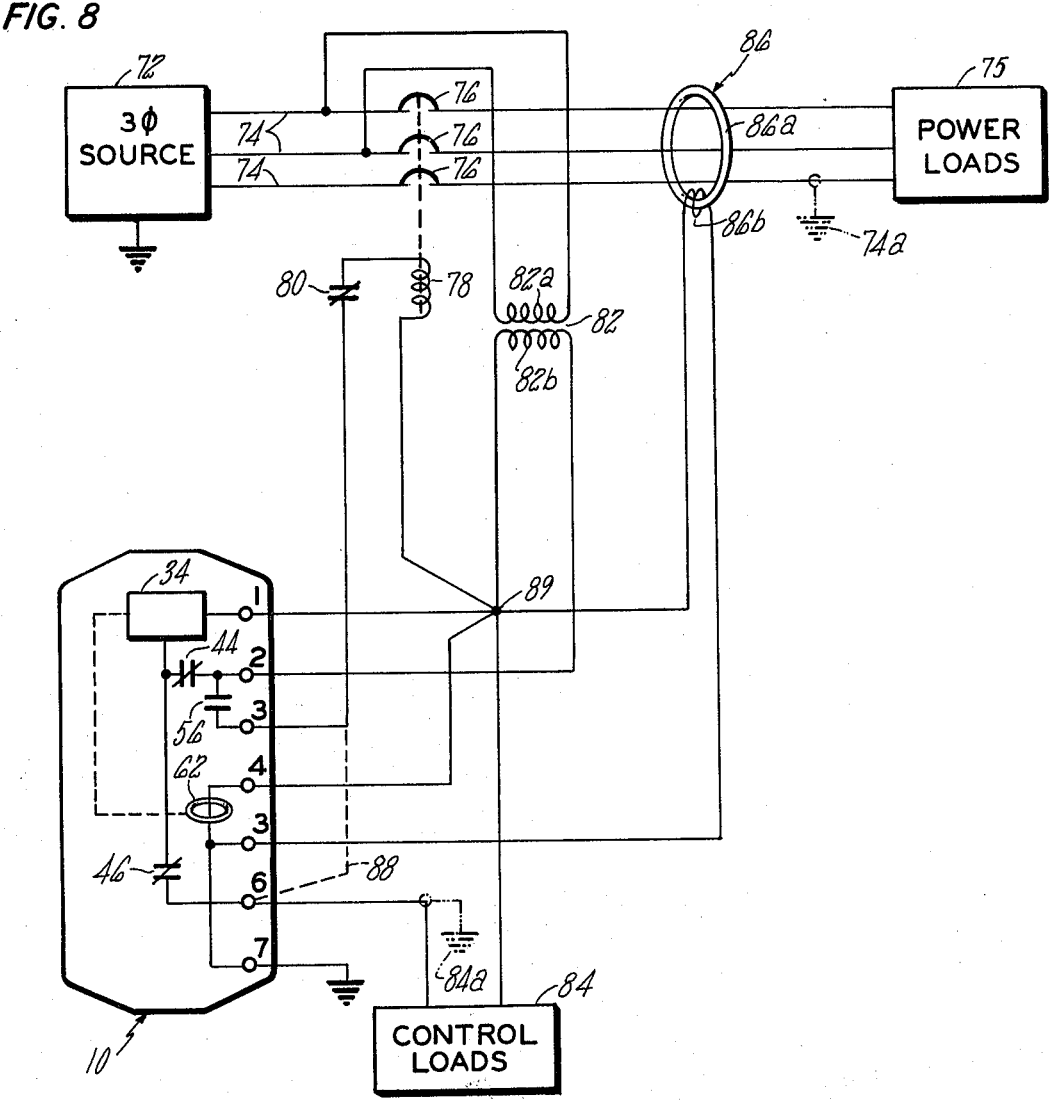
FIG. 8 is a circuit schematic diagram, partially in block form, of an alternative ground fault protection system utilizing the GFCI device of FIG. 1.
Figure 9:
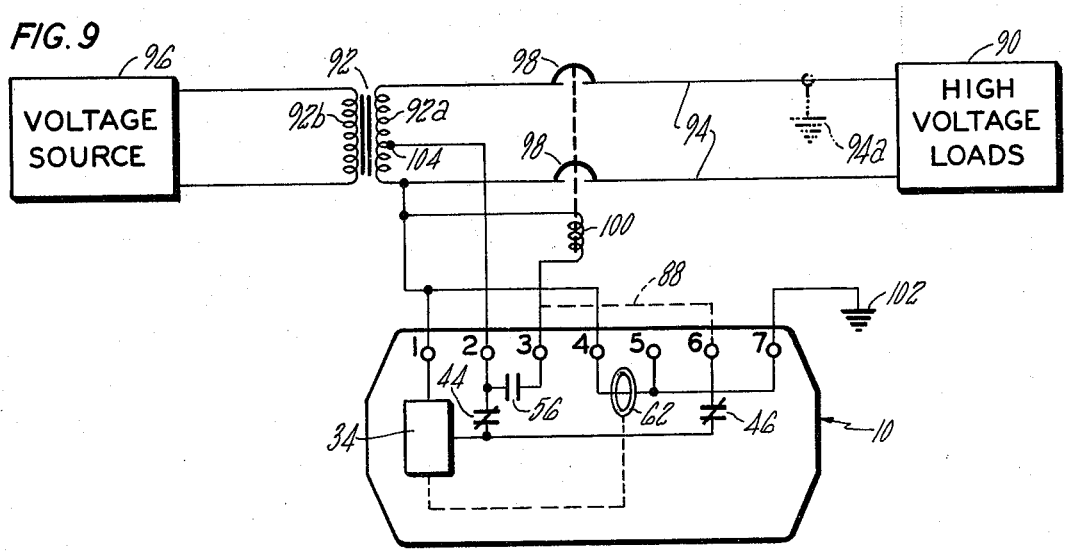
FIG. 9 is a circuit schematic diagram, partially in block form, of yet another ground fault protection system embodiment utilizing the GFCI device of FIG. 1.

Turning now to FIG. 6, the individual screw terminals 24 seen in FIGS. 2 and 3 are numbered 1 through 7 for purposes of describing the internal wiring of GFCI device 10 and the external connections thereto pursuant to achieving the ground fault protection systems of FIGS. 7 through 9. Thus terminal 1 is internally wired via a lead 60 to one side of a single turn primary winding 62a for a differential current transformer 62 included in ground fault module 34. The electronics portion of this module may be constructed in the manner taught in commonly assigned U.S. Pat. No. 3,953,766. The other side of this primary winding is connected through normal open test switch 54, resistor 64, the coil of solenoid 52, jumper 40a, and normally closed switch 44 to terminal 2. This terminal 2 is also connected via normally open switch 56 to terminal 3 and via switch 44, jumper 40a, and normally closed switch 46 to terminal 6. The junction between solenoid coil 52 and resistor 64 is connected to one module power supply input, while the junction between lead 60 and primary winding 62a is connected to the other module power supply input. As will be seen from FIGS. 7 through 9, terminals 1 and 2 are connected across a 120 VAC control power source from which module 34 receives its operating power and solenoid 52 its energizing current. From FIG. 6 it is seen that closure of test switch 54 completes an internal circuit between terminals 1 and 2 which includes differential transformer primary winding 62a. The value of resistor 64 is selected such that this primary current just exceeds an established threshold level, e.g., six milliamperes. If the GFCI device is operational, it will trip, opening switches 44, 46 and closing switch 56.

Still referring to FIG. 6, terminals 4 and 5 are respectively, internally connected via leads 66 and 68 to opposite sides of a second signal-turn primary winding 62b for differential current transformer 62. Finally, terminals 5 and 7 are internally electrically connected in common by a jumper 70.

In FIG. 7, GFCI device 10 is shown connected in a ground fault protection system for a high voltage (higher than 120 VAC) power distribution circuit including a three phase source 72 supplying power over line conductors 74 to loads 75. Circuit interrupting contacts 76 of a power circuit breaker are connected in each line conductor. The circuit breaker is equipped with a shunt trip solenoid 78 which, when energized, acts to trip the breaker contacts 76 open. Electrically connected in series with the shunt trip solenoid coil is a normally closed switch 80 which, in conventional fashion, is opened incidentally with tripping of the power circuit breaker, thus permitting the trip solenoid to be designed for limited current duty. A voltage stepdown transformer 82 has a primary winding 82a connected across two of the line conductors 74 so as to be energized from source 72. Secondary winding 82b of this transformer has its grounded side connected to terminal 1 and its ungrounded side connected to terminal 2 of GFCI device 10 to provide 120 VAC operating power therefor. The operating coil of trip solenoid 78 and switch 80 are connected in series between the grounded side of secondary winding 82b and terminal 3 of GFCI device 10. Transformer secondary 82b also is connected as a low voltage source for various control loads 84.

To sense a ground fault on the power distribution circuit, an appropriate sensor, such as a differential current transformer 86 is utilized. This transformer includes a toroidal core 86a embracing the distribution circuit conductors 74. As long as the vectorial sum of the currents flowing in the line conductors (and an optional neutral conductor, not shown) equals zero, the net flux in core 86a is also zero and no voltage is induced in a multi-turn secondary winding 86b wound thereon. Thus, no potential is developed across terminals 4 and 5 of GFCI device 10. On the other hand, if a ground fault should exist on the distribution circuit, as indicated at 74a, the vectorial current sum of the currents flowing in conductors 74 is no longer zero, and voltage is induced in secondary winding 86b, which voltage appears across terminals 4 and 5. As best seen in FIG. 6, this terminal voltage drives a current through primary winding 62b of differential transformer 62 to which ground fault module 34 responds by effecting energization of solenoid 52. Switches 44 and 46 are thus tripped open, the former removing power from the module. More importantly however, switch 56 is closed, thereby completing the energization circuit for shunt trip solenoid 78. Actuation of this solenoid trips the power breaker contacts 76 open, clearing the ground fault on the distribution circuit.

The system of FIG. 7 can be modified quite simply so as to function with a power circuit breaker tripping undervoltage release (UVR) solenoid or the holding coil of a contactor, instead of shunt trip solenoid 78. In this case, the external wiring connection to terminal 3 of GFCI device 10 is removed and brought down to terminal 6, as indicated in phantom at 88. Thus, an energization circuit is normally provided for the UVR solenoid or contactor holding coil through normally closed switches 44 and 46. When these switches are tripped open in response to a ground fault on the distribution circuit, this energization circuit is broken, and the UVR solenoid drops out to trip the power circuit breaker or the holding coil drops out to open the contactor contacts. In either case, the distribution circuit is interrupted to arrest the flow of ground leakage current.

The system of FIG. 7 can be conveniently modified in the manner shown in FIG. 8 so as to afford personnel ground fault protection for the energization circuit feeding control loads 84. To this end, the ground is removed from the one side of secondary winding 82b, and terminal 7 of GFCI device 10 is connected to ground. Terminals 1 and 4, the formerly grounded side of secondary winding 82b, one side of the shunt trip solenoid coil 78, one side of ground fault sensor secondary winding 86b, and one side of the energization circuit for control loads 84 are all electrically connected together at a common junction point 89. The other side of the control load energization circuit is connected to terminal 6 of GFCI device 10.

It will be seen that the system of FIG. 8 operates in same manner as the system of FIG. 7 to energize shunt trip solenoid 78 and trip breaker contacts 76 open in response to a distribution circuit ground fault. If the external wiring connection to terminal 3 is removed to terminal 6 of the GFCI device as indicated in phantom at 88, a power breaker tripping UVR solenoid or a contactor opening holding coil may be utilized in place of the shunt trip solenoid as described for FIG. 7. From the standpoint of control load circuit personnel ground fault protection, it is seen that the junction 89 side of control source secondary winding 82b is connected to terminal 4 and, from FIG. 6, through differential transformer primary winding 62b, jumper 70 and terminal 7 to ground. Thus, a ground fault, such as at 84a, on the ungrounded or line side of this control load energization circuit which is seen to run through normally closed switches 44, 46, will produce ground leakage current whose only return path to secondary winding 82b is through terminal 7, differential transformer primary winding 62b and terminal 4 to junction 89. If the magnitude of this leakage current exceeds the established threshold level, switches 44, 46 are tripped open to interrupt this leakage current. Preferably, module 34 is equipped with a second transformer, as disclosed in the above-noted U.S. Pat. No. 3,953,766, to afford tripping response to a de-sensitizing, low impedance ground fault on the neutral side of the control load energization circuit.

FIG. 9 discloses the application of GFCI device 10 to a personnel ground fault protection system for high voltage loads 90 fed from the secondary 92a of an isolation transformer 92 over conductors 94. A source 96 drives the primary 92b of this transformer. Contacts 98 of a circuit breaker are connected in each conductor 94 and are tripped open by a shunt trip solenoid 100. The lower side of secondary winding 92a is connected to terminal 1 of GFCI device 10, terminal 4 and thence through differential transformer primary winding 62b and terminal 7 which is externally connected to ground at 102. The lower side of secondary winding 92a is also connected through the operating coil of shunt trip solenoid 100 to terminal 3. A tap 104 on secondary winding 92a is connected to terminal 2 so as to provide the requisite 120 VAC for powering module 34 and the trip solenoid coil.

It is seen that a ground fault, such as at 94a, on the ungrounded side of the high voltage secondary circuit will create leakage current which, as in the system of FIG. 8, can only return to the grounded side of secondary winding 92a through differential transformer primary winding 62b. The GFCI device trips, causing switch 56 to close and complete the energization circuit for shunt trip solenoid 100. Breaker contacts 98 are tripped open to clear the ground fault. Again, if the ground fault clearing actuator is a UVR solenoid or a contactor holding coil, its one side would be connected to terminal 6 rather than terminal 3. Moreover, when the ground fault module 34 is equipped with grounded neutral detection, the GFCI device will also trip in response to a low impedance ground fault on the grounded or neutral side of the high voltage circuit. It will be appreciated that circuit interrupting contacts may also be connected in the primary circuit of isolation transformer 92 which are opened by an actuator connected in parallel with actuator 100. Alternatively, circuit interrupting contacts 98 may be connected in the isolation transformer primary circuit.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A ground fault circuit interrupting (GFCI) device for use in a system protecting power distribution circuits against ground faults, said GFCI device comprising, in combination:
   A. a molded case consisting of base and a cover;
   B. a switch operating mechanism mounted within said case, said switch operating mechanism including
      (1) a movable contact carrier biased toward an open circuit position,
      (2) a spring biased reset operator mounted for protrusion through an opening in said cover,
      (3) a latch conditioned by depression of reset operator to engage said carrier pursuant to positioning the latter to its closed circuit position, and
      (4) a solenoid operable upon electrical energization to disengage said latch from said carrier, whereupon said carrier springs to its open circuit position.
   C. a first switch consisting of a first stationary contact mounted within said case and a first movable contact mounted by said carrier, said first stationary and movable contacts being engaged while said carrier is in its closed circuit position and disengaged while said carrier is in its open circuit position;

D. a ground fault module mounted within said case, said module including
   (1) a current transformer having at least one primary winding, and
   (2) electronic means responsive to a net primary current excitation of said transformer for initiating energization of said solenoid pursuant to unlatching said carrier for movement to its open circuit position;
E. a normally open second switch disposed within said case in a position to be engagably actuated to its closed condition by said carrier in moving to its open circuit position; and
F. an externally accessible terminal board carried by said case and including
   (1) a first terminal internally wired to said module,
   (2) a second terminal internally wired to said solenoid and said module through said first switch,
   (3) a third terminal internally wired to said second terminal through said second switch,
   (4) a fourth terminal, and
   (5) a fifth terminal internally wired to said fourth terminal through said one transformer primary winding.

2. The ground fault circuit interrupting (GFCI) device defined in claim 1, wherein said terminal board further includes a sixth terminal internally wired to said second terminal through said first switch.

3. The ground fault circuit interrupting (GFCI) device defined in claim 2, which further includes a third switch consisting of a second stationary contact mounted within said case and a second movable contact mounted by said carrier, said third switch internally wired in series with said first switch between said second and sixth terminals.

4. The ground fault circuit interrupting (GFCI) device defined in claim 1, which further includes a test pushbutton externally accessible in an opening in said case, a normally open test switch disposed within said case in position to be closed by manual depression of said test pushbutton, and a resistor, said module further including an additional primary winding for said current transformer, said additional primary winding, said test switch and said resistor internally wired in series between said first and second terminals.

5. The ground fault circuit interrupting (GFCI) device defined in claim 2, which further includes a test pushbutton externally accessible in an opening in said case, a normally open test switch disposed within said case in position to be closed by manual depression of said test pushbutton, and a resistor, said module further including an additional primary winding for said current transformer, said additional primary winding, said test switch and said resistor internally wired in series between said first and second terminals.

6. A power distribution circuit ground fault protection system utilizing the ground fault circuit interrupting (GFCI) device of claims 1 or 4; comprising, in combination:
A. a source of control power connected across said first and second GFCI device terminals;
B. a circuit interrupting device connected in the power distribution circuit;
C. an actuator operable to initiate power circuit interrupting operation of said interrupting device, said actuator electrically connected across said first and third GFCI device terminals for energization from said control power source through said second switch; and
D. a sensor coupled with the power distribution circuit for developing a signal voltage across said fourth and fifth GFCI device terminals in response to a ground fault on the power distribution circuit, said signal voltage producing a current through said one primary winding to create a net primary current excitation of said transformer, whereby said module initiates energization of said solenoid to precipitate opening of said first switch and closure of said second switch, the latter then initiating operation of said actuator to precipitate power circuit interruption by said circuit interrupting device.

7. A power distribution circuit ground fault protection system utilizing the ground fault circuit interrupting (GFCI) device of claims 2, 3 or 5; comprising, in combination:
A. a source of control power connected across said first and second GFCI device terminals;
B. a circuit interrupting device connected in the power distribution circuit;
C. an actuator operable to initiate power circuit interrupting operation of said interrupting device, said actuator electrically connected across said first and sixth GFCI device terminals for energization from said control power source through at least said first switch; and
D. a sensor coupled with the power distribution circuit for developing a signal voltage across said fourth and fifth GFCI device terminals in response to a ground fault on the power distribution circuit, said signal voltage producing a current through said one primary winding to create a net primary current excitation of said transformer, whereby said module initiates energization of said solenoid to precipitate opening said first switch, the latter then initiating operation of said actuator to precipitate power circuit interruption by said circuit interrupting device.

8. A power distribution circuit ground fault protection system utilizing the ground fault circuit interrupting (GFCI) device of claims 2, 3 or 5; comprising, in combination:
A. a source of control power connected across said first and second GFCI device terminals, said first and fourth GFCI device terminals externally electrically connected in common, while said fifth GFCI device terminal is electrically connected to an external ground;
B. a circuit interrupting device connected in the power distribution circuit;
C. an actuator operable to initiate power circuit interrupting operation of said interrupting device, said actuator electrically connected across said first and third GFCI device terminals for energization from said control power source through second switch;
D. a control load connected across said first and sixth GFCI device contacts for energization from said control power source through at least said first switch, whereby leakage current flowing through a ground fault on the control load circuit returns to said control power source through said one transformer primary winding, thereby creating a net primary current excitation to which said module responds by initiating, via said solenoid, opening of said first switch to interrupt said control load circuit and closure of said second switch to initiate, via said actuator, power circuit interruption by said circuit interrupting device; and E. a sensor coupled with the power distribution circuit for developing a signal voltage across said fourth and fifth GFCI device terminals in response to a ground fault on the power distribution circuit, said signal voltage producing a current through said one primary winding to create a net primary current excitation of said transformer, whereby said module initiates opening of said first switch and closure of said second switch to interrupt the control load circuit and precipitate interruption of said power distribution circuit.

9. A power distribution circuit ground fault protection system utilizing the ground fault circuit interrupting (GFCI) device of claims 2, 3 or 5; comprising, in combination:

A. a source of control power connected across said first and second GFCI device terminals, said first and fourth GFCI device terminals externally electrically connected in common, while said fifth GFCI device terminal is electrically connected to an external ground;

B. a circuit interrupting device connected in the power distribution circuit;

C. an actuator operable to initiate power circuit interrupting operation of said interrupting device, said actuator electrically connected across said first and sixth GFCI device terminals for energization from said control power source through at least said first switch;

D. a control load connected across said first and sixth GFCI device contacts for energization from said control power source through at least said first switch, whereby leakage current flowing through a ground fault on the control load circuit returns to said control power source through said one transformer primary winding, thereby creating a net primary current excitation to which said module responds by initiating, via said solenoid, opening of said first switch to interrupt said control load circuit and to initiate, via said actuator, power circuit interruption by said circuit interrupting device; and E. a sensor coupled with the power distribution circuit for developing a signal voltage across said fourth and fifth GFCI device terminals in response to a ground fault on the power distribution circuit, said signal voltage producing a current through said one primary winding to create a net primary current excitation of said transformer, whereby said module initiates opening of said first switch to interrupt the control load circuit and precipitate interruption of said power distribution circuit.

10. A system utilizing the ground fault circuit interrupting (GFCI) device of claims 1 or 4 in providing personnel ground fault protection to a high voltage circuit supplied from the secondary winding of an isolation transformer, said system comprising in combination:

A. a source of control power connected across said first and second GFCI device terminals;

B. a circuit interrupting device connected to halt current flow in the high voltage circuit;

C. an actuator operable to initiate current halting operation of said interrupting device, said actuator connected across said first and third GFCI device terminals for energization from said control power source through said second switch; and D. said fourth GFCI device terminal connected to one side of the isolation transformer secondary winding and said fifth GFCI device terminal electrically connected to an external ground, whereby leakage current flowing through a ground fault on the high voltage circuit returns to the isolation transformer secondary winding through said one current transformer primary winding, thereby creating a net primary current excitation thereof to which said module responds by initiating closure of said second switch to precipitate current halting operation of said circuit interrupting device.

11. A system utilizing the ground fault circuit interrupting (GFCI) device of claims 2, 3 or 5 in providing personnel ground fault protection to a high voltage circuit supplied from the secondary winding of an isolation transformer, said system comprising in combination:

A. a source of control power connected across said first and second GFCI device terminals;

B. a circuit interrupting device connected to halt current flow in the high voltage circuit;

C. an actuator operable to initiate current halting operation of said interrupting device, said actuator connected across said first and sixth GFCI device terminals for energization from said control power source through at least said first switch; and D. said fourth GFCI device terminal connected to one side of the isolation transformer secondary winding and said fifth GFCI device terminal electrically connected to an external ground, whereby leakage current flowing through a ground fault on the high voltage circuit returns to the isolation transformer secondary winding through said one current transformer primary winding, thereby creating a net primary current excitation thereof to which said module responds by initiating opening of said first switch to precipitate current halting operation of said circuit interrupting device.

* * * * *